(12) United States Patent
Oh et al.

(10) Patent No.: US 9,086,897 B2
(45) Date of Patent: Jul. 21, 2015

(54) METHOD AND ARCHITECTURE FOR VIRTUAL DESKTOP SERVICE

(75) Inventors: Myeong-Hoon Oh, Daejeon (KR); Sun-Wook Kim, Hwaseong-si (KR); Dae-Won Kim, Daejeon (KR); Seong-Woon Kim, Gyeryong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 190 days.

(21) Appl. No.: 13/434,696

(22) Filed: Mar. 29, 2012

(65) Prior Publication Data

US 2013/0007737 A1  Jan. 3, 2013

(30) Foreign Application Priority Data

Jul. 1, 2011  (KR) .................. 10-2011-0065680

(51) Int. Cl.
  *G06F 9/455* (2006.01)
  *G06F 9/44* (2006.01)
  *G06F 9/445* (2006.01)

(52) U.S. Cl.
  CPC ............ *G06F 9/4445* (2013.01); *G06F 9/4451* (2013.01); *G06F 9/45533* (2013.01)

(58) Field of Classification Search
  CPC ..................................................... G06F 9/4445
  USPC .................................................... 718/1
  See application file for complete search history.

(56) References Cited

U.S. PATENT DOCUMENTS

| 2005/0216912 A1* | 9/2005 | Cox et al. ............. 717/178 |
| 2007/0180448 A1* | 8/2007 | Low et al. ............. 718/1 |
| 2010/0211663 A1* | 8/2010 | Barboy et al. ............. 709/223 |
| 2011/0113472 A1* | 5/2011 | Fung et al. ............. 726/3 |
| 2011/0208908 A1* | 8/2011 | Chou et al. ............. 711/112 |

(Continued)

FOREIGN PATENT DOCUMENTS

| JP | 2001-282729 A | 10/2001 |
| KR | 10-2003-0030050 A | 4/2003 |

(Continued)

OTHER PUBLICATIONS

Xuxian Jiang, Dongyan Xu, SODA: a Service-On-Demand Architecture for Application Service Hosting Utility Platforms, 2003, Proceedings of the 12th IEEE International Symposium on High Performance Distributed Computing (HPDC'03).*

*Primary Examiner* — Emerson Puente
*Assistant Examiner* — Charlie Sun

(57) ABSTRACT

The present invention relates to a method and an architecture capable of efficiently providing a virtual desktop service. The service architecture for the virtual desktop service includes a connection broker for performing the management of virtual machines, a server monitoring function, and a protocol coordination function. A resource pool is configured to manage software resources that are transferred to a specific virtual machine in a streaming form at a predetermined time and that are executed on the specific virtual machine and to provide provision information about the managed software resources at the request of the connection broker, in order to provide an on-demand virtual desktop service. A virtual machine infrastructure is configured to support hardware resources, generate virtual machines in which the software of the user terminal is operated, and provide the virtual machines as virtual desktops.

13 Claims, 5 Drawing Sheets

(56) References Cited

U.S. PATENT DOCUMENTS

| | | | |
|---|---|---|---|
| 2011/0231844 A1* | 9/2011 | Ben-Shaul et al. | 718/1 |
| 2012/0041970 A1* | 2/2012 | Ghosh et al. | 707/769 |
| 2012/0072898 A1* | 3/2012 | Pappas et al. | 717/171 |
| 2012/0084381 A1* | 4/2012 | Alladi et al. | 709/213 |
| 2012/0179874 A1* | 7/2012 | Chang et al. | 711/128 |
| 2012/0212579 A1* | 8/2012 | Frojdh et al. | 348/43 |
| 2012/0226998 A1* | 9/2012 | Friedl et al. | 715/760 |

FOREIGN PATENT DOCUMENTS

| | | |
|---|---|---|
| KR | 10-2006-0028525 A | 3/2006 |
| KR | 1020080110894 A | 12/2008 |
| KR | 10-2009-0065127 A | 6/2009 |
| KR | 10-2010-0123847 A | 11/2010 |

* cited by examiner

METHOD AND ARCHITECTURE FOR VIRTUAL DESKTOP SERVICE

CROSS REFERENCE TO RELATED APPLICATION

This application claims the benefit of Korean Patent Application No. 10-2011-0065680, filed on Jul. 1, 2011, which is hereby incorporated by reference in its entirety into this application.

BACKGROUND OF THE INVENTION

1. Technical Field

The present invention relates generally to technology related to virtual desktop services or desktop virtualization.

2. Description of the Related Art

Recently, a large number of activities on research into as well as the standardization of virtual desktop services as services for providing data storage hard discs, applications, etc. to the space of the Internet have been conducted.

Korean Unexamined Patent Application Publication Nos. 2010-0123847 and 2009-0111576 disclose in detail a virtual desktop service technology.

However, the architecture of such a virtual desktop service has not yet been standardized, and thus there is a limitation in that the virtual desktop service cannot be efficiently provided to users.

SUMMARY OF THE INVENTION

Accordingly, the present invention has been made keeping in mind the above problems occurring in the prior art, and an object of the present invention is to provide an architecture that is capable of efficiently providing a virtual desktop service.

In accordance with an aspect of the present invention to accomplish the above object, there is provided a service architecture for a virtual desktop service, including a connection broker, which is a software program allowing a user terminal to be connected to a virtual desktop and which performs a user authentication and license verification function of validating the user terminal and software of the user terminal, a function of managing a virtual machine allocated to the user terminal, a function of monitoring a server that measures an activity level of the virtual machine, and a protocol coordination function of allowing an identical protocol to be used between the user terminal and the server; a resource pool configured to manage software resources that are transferred to a specific virtual machine in a streaming form at a predetermined time and that are executed on the specific virtual machine, and to provide provision information about the managed software resources at a request of the connection broker, in order to provide an on-demand virtual desktop service; and a virtual machine infrastructure configured to support hardware resources, generate virtual machines in which the software of the user terminal is operated, and provide the virtual machines as virtual desktops.

In accordance with another aspect of the present invention to accomplish the above object, there is provided a method for a virtual desktop service, including validating, by a connection broker, a relevant user by using a user identification (ID) and a password when a user terminal is connected using one or more of Secure Shell (SS) and Transport Layer Security (TLS) security protocols; identifying, by the connection broker, a relevant user profile to allocate a virtual machine and searching for a virtual machine that satisfies a hardware configuration of the user terminal and that is optimal for a computing environment, by using a provisioning function; transmitting, by the connection broker, information about the hardware configuration, and then requesting a virtual machine infrastructure to generate a virtual machine if there is no suitable virtual machine; applying, by the connection broker, the user profile to an allocated or generated virtual machine after the virtual machine has been allocated or generated; generating, by the virtual machine infrastructure, a session in which a relevant virtual desktop is to be delivered, and dispatching session information about the generated session to the connection broker; transmitting, by the connection broker, the session information to the user terminal, and then enabling the user terminal to be connected to the virtual machine infrastructure; communicating, by the user terminal, experience information of users using the virtual desktop, based on a virtual desktop delivery protocol; and executing, by the user terminal, a log-off operation to prevent user data from being lost when the virtual desktop service is terminated, and updating, by the connection broker, a changed user profile in a user profile pool during the log-off operation.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
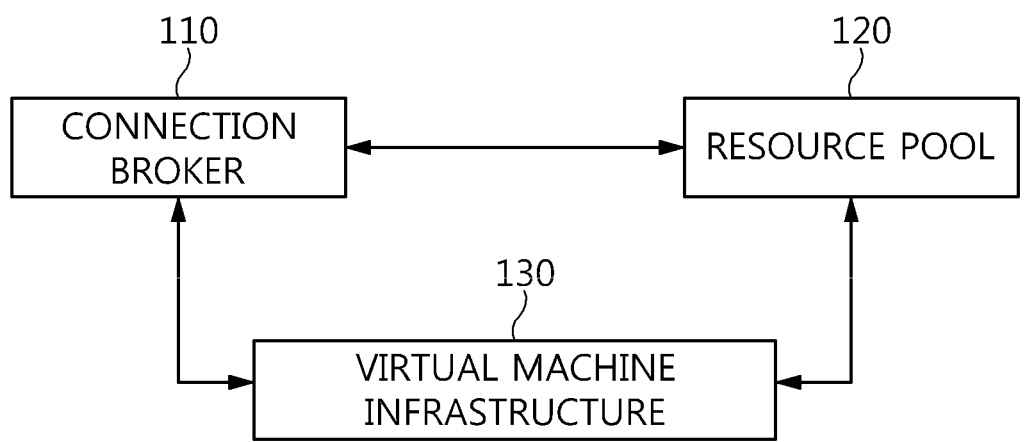
FIG. 1 is a diagram showing a service architecture for a virtual desktop service according to an embodiment of the present invention.

Hereinafter, embodiments of the present invention will be described in detail with reference to the attached drawings. Reference now should be made to the drawings, in which the same reference numerals are used throughout the different drawings to designate the same or similar components. The present invention will be described in detail below with reference to the accompanying drawings. In the following description, redundant descriptions and detailed descriptions of known functions and elements that may unnecessarily make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

FIG. 1 is a block diagram showing a service architecture for a virtual desktop service according to an embodiment of the present invention.

There are several steps performed in order for a service provider to provide the virtual desktop service to an end-user, and these steps may be performed by three principal actors, namely, a Connection Broker (CB) 110, a Resource Pool (RP) 120, and a Virtual Machine Infrastructure (VMI) 130, as shown in FIG. 1.

Below, the functions of the three principal actors will be described in detail with reference to FIG. 2.

Figure 2:
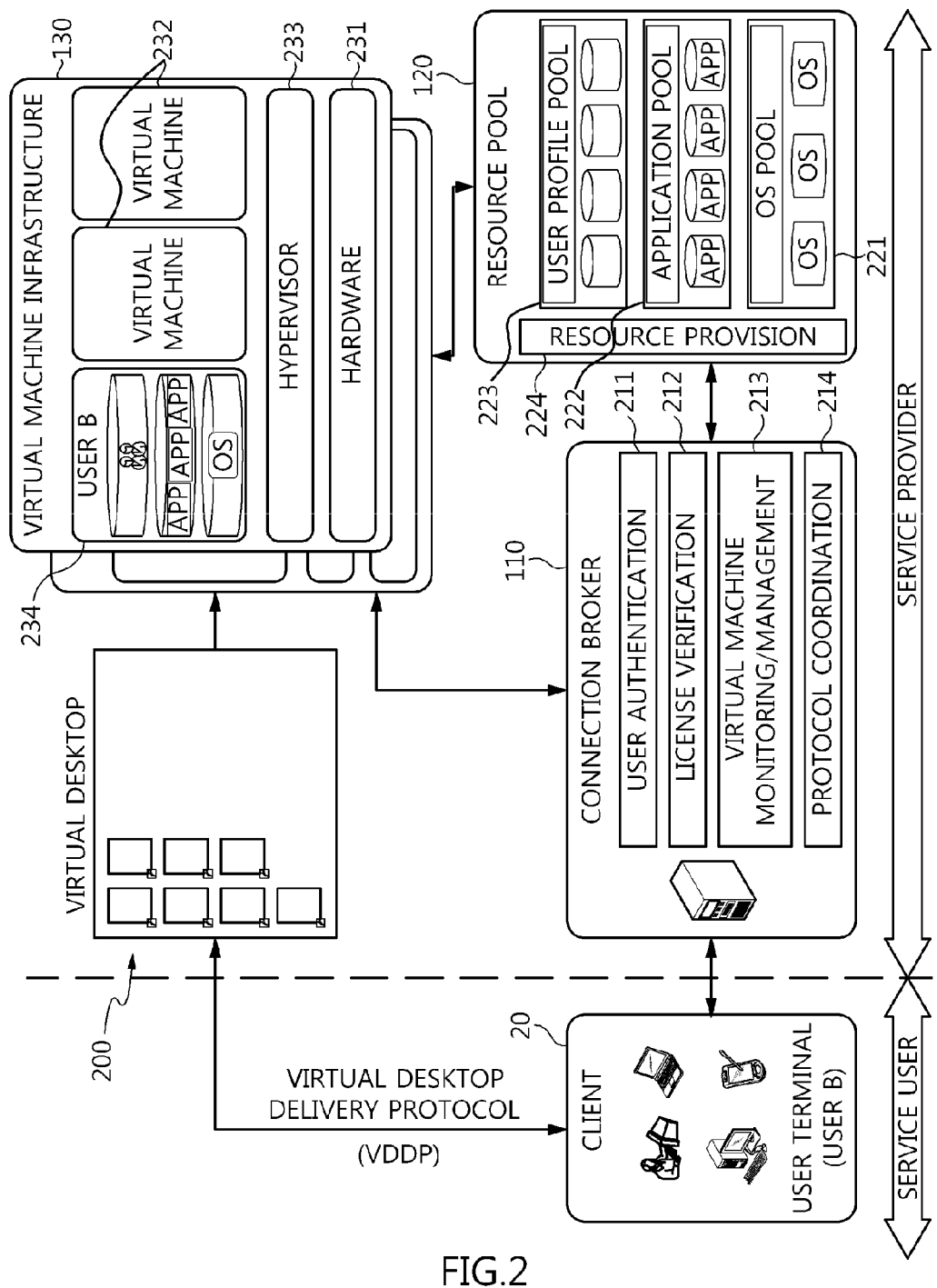
FIG. 2 is a conceptual diagram showing the service architecture for the virtual desktop service according to an embodiment of the present invention.

FIG. 2 is a conceptual diagram showing a service architecture for the virtual desktop service according to an embodiment of the present invention.

Referring to FIG. 2, the connection broker 110 may be a software program enabling a user terminal 20 to be connected to a virtual desktop 200, and performs a user authentication function 211 and a license verification function 212 for validating the user terminal 20 and the software of the user terminal 20, a management/monitoring function 213 of managing a Virtual Machine (VM) allocated to the user terminal 20 and monitoring a server for measuring the activity level of the virtual machine, and a protocol coordination function 214 for allowing the same protocol to be used between the user terminal 20 and servers.

Such a connection broker 110 may provide a connection between backup storage and virtual desktop servers.

Referring to FIG. 2, the resource pool 120 may manage three different types of high-capacity software resources, i.e. Operating Systems (OSs), applications, and user profiles, to provide an on-demand virtual desktop service. That is, as shown in FIG. 2, the resource pool 120 includes an OS pool 221, an application pool 222, and a user profile pool 223.

The software resources managed by the resource pool 120 are transferred to a specific virtual machine at a predetermined time in a streaming form and are executed on the specific virtual machine.

Further, the resource pool 120 may provide provision information 224 related to relevant software resources at the request of the connection broker 110.

The above-described user profiles may include, for example, individual pieces of information, such as a hardware configuration (for example, a Central Processing Unit (CPU), Random Access Memory (RAM), Input/Output (I/O) devices, etc.), an OS that is used, a selected application, and the user's computing environment information (for example, display resolution, an Internet access scheme, etc.). Such user profiles may be managed for respective users.

Referring to FIG. 2, the virtual machine infrastructure 130 performs the principal functions of supporting hardware resources 231 and generating Virtual Machines (VMs) 232.

For virtual desktop servers, a virtualization technology also called a hypervisor 233, for example, will be a stringent requirement for the efficient use of the above-described hardware resources 231.

The above-described hypervisor 233 abstracts the physical hardware resources 231, and dynamically allocates the physical hardware resources 231 to the higher level of the software 234.

That is, the hardware resources 231 supported by the virtual machine infrastructure 130 may be efficiently used depending on the hypervisor virtualization technology of the virtual desktop servers, which abstracts the physical hardware resources 231 and dynamically allocates them to the higher level of the software 234.

Consequently, the virtual machine infrastructure 130 provides the virtual machines 232 in which the software 234 of the user terminal 20 is operated. These virtual machines are called virtual desktops 200.

Below, the method for the virtual desktop service will be described in detail with reference to FIG. 3, together with FIG. 2 that illustrates a conceptual diagram of the service architecture for the virtual desktop service.

Figure 3:
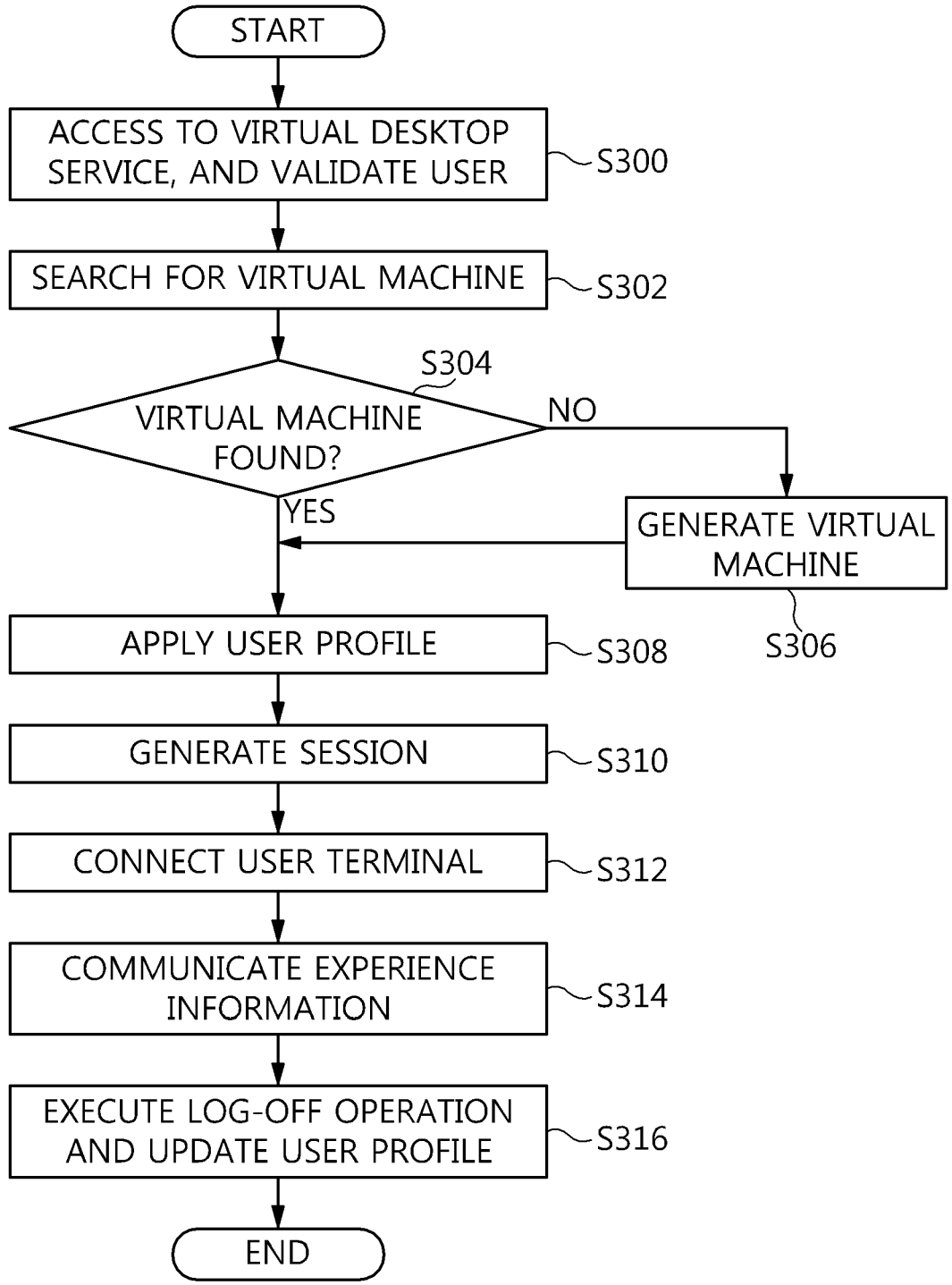
FIG. 3 is a flowchart showing a method for a virtual desktop service according to an embodiment of the present invention.

FIG. 3 is a flowchart showing the method for the virtual desktop service according to an embodiment of the present invention.

Referring to FIG. 3, the method for the virtual desktop service according to the embodiment of the present invention is performed to include a user terminal connection and user validation step S300, a virtual machine search step S302, a user profile application step S308, a session generation step S310, a user terminal connection step S312, an experience information communication step S314, and a log-off operation and user profile update step S316.

At the user terminal connection and user validation step S300, when the user terminal 20 accesses the virtual desktop service using one or more of Secure Shell (SSH) and Transport Layer Security (TLS) security protocols, the connection broker 110 validates a relevant user using his or her user Identification (ID) and password.

At the virtual machine search step S302, the connection broker 110 identifies a relevant user profile so as to allocate virtual machines, and searches for a virtual machine that satisfies the hardware configuration of the user terminal 20 and that is optimal for a computing environment, using a provisioning function.

As a result of searching performed at the virtual machine search step S302, it is determined whether a suitable virtual machine has been found at step S304. If it is determined that no suitable virtual machine is present, the connection broker 110 requests the virtual machine infrastructure 130 to generate a virtual machine by transmitting information about the hardware configuration. Accordingly, the virtual machine infrastructure 130 generates a virtual machine at step S306.

At the user profile application step S308, after the virtual machine has been allocated or generated, the connection broker 110 applies the user profile to the allocated or generated virtual machine.

At the user profile application step S308, the connection broker 110 may install an OS and an application required to construct the virtual desktop 200.

At the session generation step S310, a session in which the virtual desktop 200 is to be delivered is generated in the virtual machine infrastructure 130, and session information about the generated session is dispatched to the connection broker 110.

At the user terminal connection step S312, the connection broker 110 transmits the session information to the user terminal 20, and the user terminal 20 is connected to the virtual machine infrastructure 130.

At the experience information communication step S314, the user terminal 20 communicates the experience information of users using the virtual desktop 200 on the basis of a Virtual Desktop Delivery Protocol (VDDP).

At the log-off operation and user profile update step S316, the user terminal 20 executes a log-off operation so as to prevent user data from being lost when the virtual desktop service is terminated, and the connection broker 110 updates the changed user profile in the user profile pool 223 during the execution of the log-off operation.

Also, at the log-off operation and user profile update step S316, the connection broker 110 may return a relevant virtual machine so that the virtual machine is available.

Below, the functional layers of the virtual desktop service according to an embodiment of the present invention will be described in detail with reference to FIGS. 4 and 5.

Figure 4:
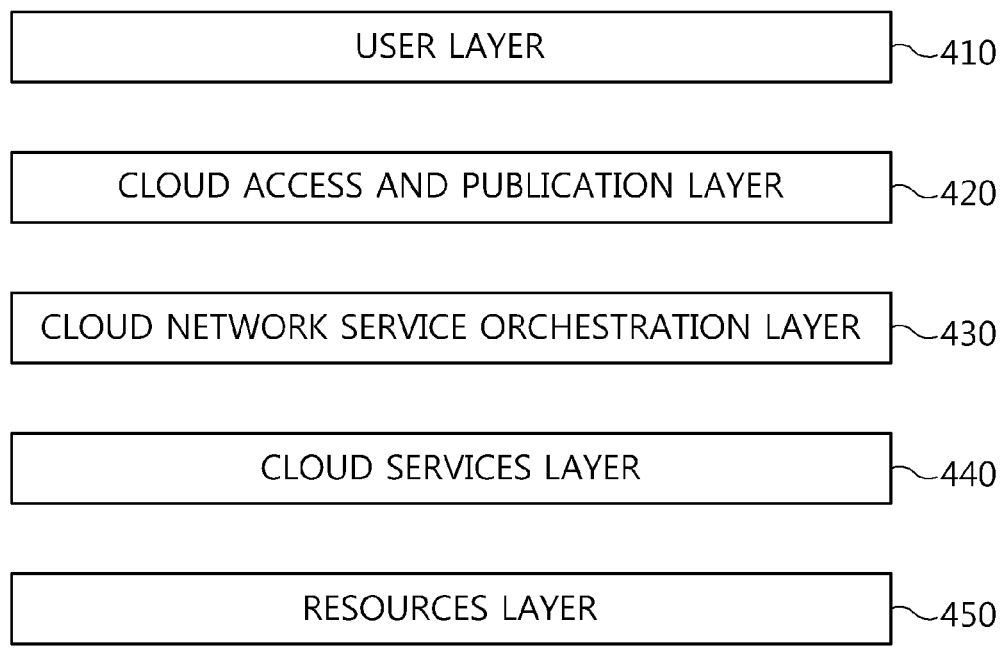
FIG. 4 is a diagram showing a functional layered architecture for the virtual desktop service according to an embodiment of the present invention.

FIG. 4 is a diagram showing a functional layered architecture for the virtual desktop service according to an embodiment of the present invention.

Referring to FIG. 4, the functional layered architecture for the virtual desktop service according to the embodiment of the present invention includes functional layers such as a user layer 410, a cloud access and publication layer 420, a cloud network service orchestration layer 430, a cloud services layer 440, and a resources layer 450.

The above-described functional layers will be individually described below with reference to FIG. 5.

Figure 5:
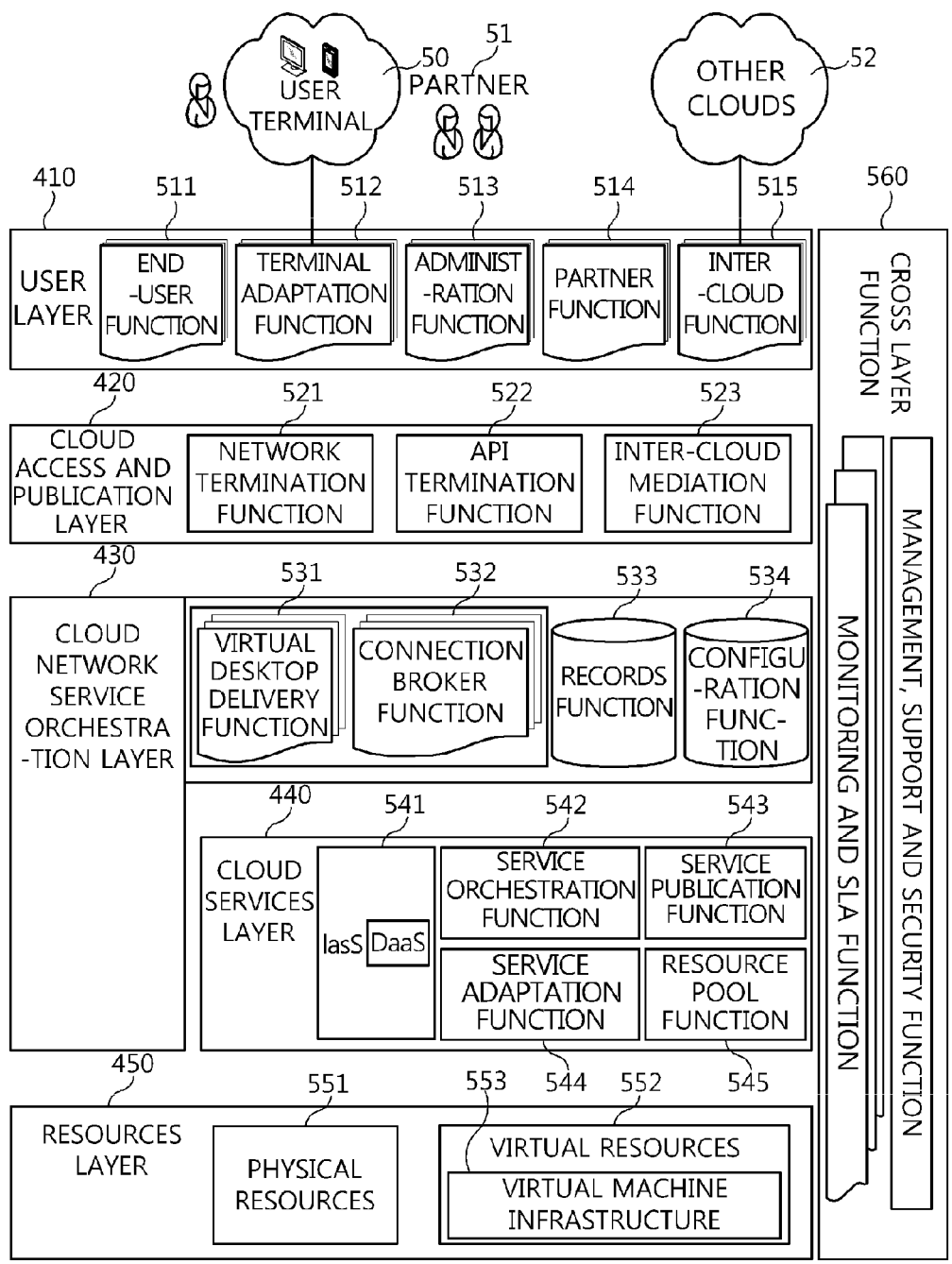
FIG. 5 is a conceptual diagram showing the functional layered architecture for the virtual desktop service according to an embodiment of the present invention.

FIG. 5 is a diagram showing the functional layered architecture for the virtual desktop service according to an embodiment of the present invention.

Referring to FIG. 5, the user layer 410 is used to perform an interaction between a user terminal 50 and the cloud infrastructure, transmit a cloud service request, access the cloud service, and manage or monitor cloud resources, and includes an end-user function 511, a terminal adaptation function 512, an administration function 513, a partner function 514 with partners 51, an inter-cloud function 515, etc.

When receiving the cloud service request, the cloud orchestrates its own resources or the resources of other clouds using the inter-cloud function 515, and provides the cloud service via the user layer 410.

The end-user function 511 supports an end user, that is, the user terminal 50, so that the user terminal 50 accesses and consumes the cloud service.

The administration function 513 supports a business administrator in managing cloud resources and services in a business process.

The partner function 514 enables a partner relationship to be formed via a Cloud Service Provider (CSP).

The inter-cloud function 515 provides an interconnection interface and broker function so as to interconnect a relevant cloud to the clouds of a plurality of CSPs. Such an inter-cloud function 515 includes an inter-cloud service broker function, an inter-cloud portal function, etc.

The inter-cloud broker function provides an alternative solution to cloud users or applications so as to access the cloud services and resources of other CSPs 52.

The user terminal for the virtual desktop service may be any of various types of terminals such as a laptop computer, a desktop PC, a thin client, and a mobile phone.

Further, terminal adaptation refers to the function of allowing a terminal device to provide a desktop having a suitable resolution among various resolutions of different peripherals in different band environments.

Referring to FIG. 5, the cloud access and publication layer 420 provides a common interface to execute manual and automated cloud actions and consumption, grants cloud service consumption requests received from consumers or business processes using cloud Application Program Interfaces (APIs) required to access the services and resources of the Cloud Service Providers (CSPs), and includes a network termination function, an API termination function, an inter-cloud mediation function, etc.

Referring to FIG. 5, the cloud network service orchestration layer 430 includes a virtual desktop delivery function 531 for encapsulating and delivering access to the entire information system environment or access to a remote client device via a network, and a connection broker function 532 including an authentication entity, a coordination entity, a monitoring and management entity, and a verification entity. The authentication entity allows the connection broker to provide approved access in a combination of personalized applications for different security levels by consulting a directory server so as to authenticate a user desktop session. The coordination entity allows the connection broker to perform a coordination function so that after the user desktop session has been authenticated, a common communication protocol for data and video transmission is used between the user terminal and the virtual desktop, in the case where various communication protocols may exist between the user terminal and the virtual desktop. The monitoring and management entity allows the connection broker to perform the actions of monitoring the runtime status of the virtual machine and guaranteeing an operating environment for the required applications. The verification entity allows the connection broker to provide a software license verification function so that the user terminal 50 can access a validated application hosted on the virtual desktop.

In the above-described virtual desktop delivery function 531, the Virtual Desktop Delivery Protocol (VDDP) is the core component of the virtual desktop delivery function 531, and provides a communication channel between the server for Desktop as a Service (DaaS) and the user terminal 50 so as to transfer all pieces of interaction information, for example, information about a display, input, a cursor, control and configuration, and monitoring information.

Further, in the above-described monitoring and management entity, the connection broker commands the virtual machine infrastructure to allocate a new idle virtual machine instance in response to a newly received request, or allocate a previous instance in response to a request presented by a client-side device after having recovered from a system failure. Also, the connection broker may request the virtual machine infrastructure to prepare for a new cloud virtual machine for a new log-in user session.

The above-described cloud network service orchestration layer 430 further includes a records function 533, a configuration function 534, etc.

Referring to FIG. 5, the cloud services layer 440 includes a DaaS function 541 and a resource pool function 545. The DaaS function provides the virtual desktop service to the user terminal 50 via a broadband network. The resource pool function 545 is a broadband resource repository or repository server set in which guest OSs and applications are serialized and stored, and includes a visualized modeling tool which generates a virtual template enabling the cloud virtual machine to be generated by the virtual machine infrastructure. The resource pool function 545 has the ability to dynamically assemble resources that are required by a virtual desktop currently being executed and that have OSs, application software, user profiles and system configuration, and to produce relevant image files. Further, the resource pool function 545 supports a network-based bootstrap protocol that enables communication with the virtual machine infrastructure and that enables virtual desktops to be remotely generated from the serialized image files.

As shown in FIG. 5, the above-described cloud services layer 440 may further include a service orchestration function 542, a service publication function 543, and a service adaptation function 544.

Referring to FIG. 5, the resources layer 450 has physical resources 551 including computing resources, storage resources, network resources, power resources, and other essential facilities in the cloud computing environment, and virtual resources 552 including virtual machines, virtual network resources, and virtual storage resources.

The virtual machines refer to virtual machines generated in a virtual machine infrastructure 553 using different server virtualization technologies such as Xen and a Kernel-based Virtual Machine (KVM).

Referring to FIG. 5, the functional layered architecture for the virtual desktop service according to the embodiment of the present invention may further provide a cross layer function 560 including a monitoring and Service Level Agreement (SLA) function and a management, support and security function.

The above-described virtual machine infrastructure 553 denotes a cluster environment having High Availability (HA) characteristics, and is internally configured such that a large number of running virtual machine instances are generated from the same virtual machine template and are composed of identical parameters. Since almost all virtual machine infrastructures 553 provide virtual machine migration capability, they enable a currently running instance to migrate to another hosting server in the case of a system failure so as to maintain business continuity.

The virtual desktop service described in the present specification may be a service for providing a data storage hard disc or applications to the space of the Internet. In other words, this service may be a desktop service using a virtual machine generated by applying desktop virtualization technology, rather than using such actual physical hardware for a PC or a business desktop. In this case, the generated virtual machine for the desktop is located at a remote place, such as in an Internet data center, and can be used like a local desktop at any time and from anywhere.

The virtual desktop service described in the present specification may be a DaaS service, a cloud computing service, or a cloud desktop service.

The architecture for the virtual desktop service according to the embodiment of the present invention (the service architecture and the functional layered architecture) may be the design scheme of a system or a server that provides the virtual desktop service to the user terminal, or the system or the server itself that provides the virtual desktop service to the user terminal.

In the above description, although all components constituting the embodiments of the present invention have been described as being combined into a single body or as being combined into and operated as a single body, the present invention is not necessarily limited by these embodiments. That is, one or more of all the components may be selectively combined and operated within the scope of the object of the present invention. Further, all the components may be individually implemented as independent hardware devices, but some or all of the components may also be selectively combined and implemented in the form of a computer program having program modules which perform some or all of the functions combined by one or more hardware devices. The code and code segments constituting the computer program may be easily inferred by those skilled in the art to which the present invention pertains. Such a computer program is stored in computer readable storage media and is read and executed by the computer, so that the embodiments of the present invention may be implemented. Examples of the storage media for storing the computer program may include magnetic recording media, optical recording media, carrier wave media, etc.

In the present specification, such terms as "comprise", "include" or "have" mean that the relevant components may be included unless differently defined, so that it should be understood that other components may be further included rather than being excluded. All terms used here including technical or scientific terms have the same meanings as the terms generally understood by those skilled in the art to which the present invention pertains. The terms identical to those defined in dictionaries for general use should be interpreted as having meanings identical to contextual meanings of the related art, and are not interpreted as being ideal or excessively formal meanings unless they are definitely defined in the present specification.

As described above, the present invention is advantageous in that an architecture capable of efficiently providing a virtual desktop service can be provided.

The above-description is merely intended to illustratively describe the technical spirit of the present invention, and various changes and modifications can be made by those skilled in the art without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims and all technical spirits falling within the equivalent scope thereof should be interpreted as being included in the scope of the present invention.

What is claimed is:

1. A method for a virtual desktop service, comprising:
validating, by a connection broker, a user by using a user identification (ID) and a password when a user terminal is connected using one or more security protocols;
identifying, by the connection broker, a user profile to allocate a virtual machine and searching for the virtual machine that satisfies a hardware configuration of the user terminal;
transmitting, by the connection broker, information about the hardware configuration to request a virtual machine infrastructure to generate a new virtual machine if there is no suitable virtual machine;
applying, by the connection broker, the user profile to the allocated or generated virtual machine after the virtual machine has been allocated or the new virtual machine has been generated;
generating, by the virtual machine infrastructure, a connection in which a virtual desktop is to be delivered, and dispatching connection information about the generated connection to the connection broker,
  wherein the virtual machine infrastructure supports high availability features with predefined configuration parameters, and
  wherein running virtual machine instances are generated from a same virtual machine template with the predefined configuration parameters and are composed of identical parameters;
transmitting, by the connection broker, the connection information to the user terminal to connect the user terminal to the virtual machine infrastructure,
  wherein the connection broker coordinates a delivery protocol including a virtual desktop delivery protocol between the user terminal and a virtual desktop server,
  wherein the virtual desktop delivery protocol provides communication channels between the user terminal and the virtual desktop server and transfers interaction information including display, configuration and monitoring information, and
  wherein the virtual desktop delivery protocol performs a function for encapsulating and delivering either access to an entire information system environment or access to a remote user terminal via a network; and updating, by the connection broker, a changed user profile in a user profile pool during execution of a log-off operation.

2. The method of claim 1, wherein the applying is configured such that the connection broker installs an operating system and an application required to construct the virtual desktop.

3. The method of claim 1, the method further comprising managing, by the connection broker, the virtual machine allocated to the user terminal, and monitoring, by the connection broker, a virtual desktop server for measuring an activity level of the virtual machine.

4. The method of claim 1, the method further comprising managing, by a resource pool, operating systems, applications, and user profile software resources to be streamed to the virtual machine, and providing, by the resource pool, information about the managed software resources at a request of the connection broker to support an on-demand virtual desktop service.

5. The method of claim 1, wherein the user profiles comprise pieces of individual information about a hardware configuration of the user terminal, an operation system used in the user terminal, an application selected by the user terminal, and computing environment information of the user terminal.

6. The method of claim 1, wherein the hardware resources supported by the virtual machine infrastructure are used by hypervisor virtualization technology of a virtual desktop server, which abstracts physical hardware resources and dynamically allocates the physical hardware resources to a higher level of software.

7. A system for providing a virtual desktop service, comprising:

a computer having a processor; and a non-transitory computer readable medium with computer executable instructions stored thereon which, when executed by the processor, perform the following method:

validating, by a connection broker, a user by using a user identification (ID) and a password when a user terminal is connected using one or more security protocols;

identifying, by the connection broker, a user profile to allocate a virtual machine and searching for the virtual machine that satisfies a hardware configuration of the user terminal;

transmitting, by the connection broker, information about the hardware configuration to request a virtual machine infrastructure to generate a new virtual machine if there is no suitable virtual machine;

applying, by the connection broker, the user profile to the allocated or generated virtual machine after the virtual machine has been allocated or the new virtual machine has been generated;

generating, by the virtual machine infrastructure, a connection in which a virtual desktop is to be delivered, and dispatching connection information about the generated connection to the connection broker, wherein the virtual machine infrastructure supports high availability features with predefined configuration parameters, and wherein running virtual machine instances are generated from a same virtual machine template with the pre-defined configuration parameters and are composed of identical parameters;

transmitting, by the connection broker, the connection information to the user terminal to connect the user terminal to the virtual machine infrastructure, wherein the connection broker coordinates a delivery protocol including a virtual desktop delivery protocol between the user terminal and a virtual desktop server, wherein the virtual desktop delivery protocol provides communication channels between the user terminal and the virtual desktop server and transfers interaction information including display, configuration and monitoring information, and wherein the virtual desktop delivery protocol performs a function for encapsulating and delivering either access to an entire information system environment or access to a remote user terminal via a network; and updating, by the connection broker, a changed user profile in a user profile pool during execution of a log-off operation.

8. The system of claim 7, wherein the applying is configured such that the connection broker installs an operating system and an application required to construct the virtual desktop.

9. The system of claim 7, wherein the updating is configured such that the connection broker returns the virtual machine so that the virtual machine is available to another user.

10. The system of claim 7, the system further comprising managing, by the connection broker, the virtual machine allocated to the user terminal, and monitoring, by the connection broker, a virtual desktop server for measuring an activity level of the virtual machine.

11. The system of claim 7, the system further comprising managing, by a resource pool, operating systems, applications, and user profile software resources to be streamed to the virtual machine, and providing, by the resource pool, information about the managed software resources at a request of the connection broker to support an on-demand virtual desktop service.

12. The system of claim 7, wherein the user profiles comprise pieces of individual information about a hardware configuration of the user terminal, an operation system used in the user terminal, an application selected by the user terminal, and computing environment information of the user terminal.

13. The system of claim 7, wherein the hardware resources supported by the virtual machine infrastructure are used by hypervisor virtualization technology of a virtual desktop server, which abstracts physical hardware resources and dynamically allocates the physical hardware resources to a higher level of software.

* * * * *